Inventor
DeWitt Henry West
By *a. w. Teller*
Attorney

United States Patent Office 3,517,766
Patented June 30, 1970

---

3,517,766
ELECTRIC VEHICLE POWERED BY A CONTINUOUSLY CHARGED ELECTRIC BATTERY AND HAVING AN ELECTRICAL CIRCUIT CONTAINING A TWIN ELECTRIC GENERATOR POWER SYSTEM
De Witt Henry West, Port Eynon, Swansea, Glamorganshire, Wales, assignor to Anthony William Deller
Continuation-in-part of application Ser. No. 612,143, Jan. 27, 1967. This application Feb. 12, 1969, Ser. No. 802,322
Int. Cl. B60k 1/00; B60l 11/04
U.S. Cl. 180—65
15 Claims

ABSTRACT OF THE DISCLOSURE

An electric vehicle and an electric power supply system for a battery-operated vehicle comprising a traction motor, and internal combustion engine driving a pair of electrical generators, and a battery. The battery is continuously charged by one generator and the traction motor has its field winding connected to the battery and its armature receives a variable voltage from the other generator.

RELATED APPLICATION

The present application is a contination-in-part of my co-pending U.S. application Ser. No. 612,143, filed Jan. 27, 1967 and now abandoned.

SPECIFICATION

The present invention relates to improvements in battery-operated vehicles and, more particularly, to an electric power supply system for a battery-operated vehicle, the electric battery of which is able to be continuously charged through a generator driven by a small internal combustion engine.

As is well known to those skilled in the art, electric cars were old vehicles per se for many years. Around the turn of the century, not only electric commercial vehicles, such as trucks, lorries and vans, were in great use, but electric passenger vehicles were likewise used. As the art developed and as vehicles powered by internal combustion engines became more economical and more efficient, the old electric vehicles were replaced. However, even under present conditions, some electric commercial vehicles are still in use.

Electric storage batteries were used and still are used to provide the electric power for the electric vehicles. Prior to 1900, lead-acid storage batteries were introduced and were usually employed in electric vehicles for the energy. At the turn of the century, nickel-iron or Edison batteries became available for practical use. In recent years, nickel-cadmium batteries were introduced and were more efficient.

Developments in recent years have improved all batteries. Thus, it is asserted that nickel-cadmium batteries possess relatively low internal resistance and that such batteries can actually deliver more of their "nominal" capacity than similarly rated lead-acid batteries. As a result, nickel-cadmium batteries with lower ampere-hour ratings can be used and the cost of such smaller units is comparable to that of larger lead-acid batteries. Although nickel-cadmium batteries have long lives, such as 20 years or so, such life may be longer than that of the vehicle. Under such conditions, the lead-acid batteries having shorter lives, such as 5 to 10 years, may be sufficient. However, the disadvantages of the lead-acid batteries include their very heavy weight, their great bulk, their combersomeness in handling, and their poorer electrical characteristics or properties. With quick charging cycles, the lead-acid batteries tend to build up sediment in the bottoms of the cells which eventually short circuits the plates.

Modern requirements of aircraft and space vehicles have caused the creation, discovery and development of new storage batteries. For instance, among these new storage batteries may be mentioned, the lithium or Gulton battery, the sodium-sulfur or Ford battery, and the silver-zinc or Yardney battery. Other developments embrace the zinc-air battery of the General Atomic Division of General Dynamics and the organic battery of Rembaum, Gutmann and Hermann using electrodes of magnesium and platinum.

Those skilled in the art know that each battery has its own individual characteristics. Although the lead-acid battery is heavy, bulky and cumbersome and does not possess superior electrical characteristics, nevertheless, it has an initial low cost. On the other hand, a nickel-cadmium battery has a high discharge rate, only loses very little of its charge after prolonger standby, does not freeze at any state of charge, retains high performance at sub-zero temperatures, and possesses a longer life than other batteries at high temperatures, but it has a high initial cost. Furthermore, a nickel-cadmium battery has good recharging cycles. As no corrosive vapors or fumes, such as sulfuric acid vapors, are given off during charging or discharging, nickel-cadmium batteries do not require special containers but can be housed anywhere. It is believed that the zinc-air battery might be practical for providing the electrical energy to propel industrial trucks, delivery vans, city buses and commuter autos. This battery is supposed to have a potential of an energy density of about four to about seven times greater than that of a conventional lead-acid storage battery. Similarly, it is expected that the sodium-sulfur battery will provide electrical energy for a practical electric-powered vehicle. It can store up to 15 times as much electricity as a comparable weight lead-acid battery. While vehicles powered with lead-acid batteries are limited to about 30 to about 50 miles without recharging, sodium-sulfur batteries might enable a vehicle to go about twice the distance or even up to four times the distance. The big problems with lead-acid batteries involve the heavy weight, the limited range between charges, the sluggishness, and the limits on practical speed, but the silver-zinc battery weighs only about one-third of a comparable lead-acid battery, can be recharged on ordinary house current, can develop speeds of 55 miles per hour and a range of about 77 miles and an acceleration time of about five seconds to go from zero to about 30 miles per hour. Moreover, the lithium battery has a light weight and can propel a compact car about 150 miles between charges. It is likewise stated that it can be recharged within a few minutes for many thousands of times. Lead-acid car batteries have an energy intensity of about 10 watt-hours per pound whereas nickel-cadmium batteries have about 14 to about 26, silver-cadmium batteries from about 24 to about 35, silver-zinc from about 50 to about 75, lithium from about 100 to a theoretical of 600, and sodium-sulfur of about 150.

It is well known that electrically-powered vehicles have interested the art because of their economy, their flexibility, their freedom from obnoxious fumes, their quiet operation and efficient energy operation, but they have a limited range of operation, and a restricted acceleration and velocity. For example, a typical prior vehicle is one having a limited range of about 75 miles without recharging and a restricted velocity of about 20 miles per hour while carrying about one ton of lead-acid storage batteries. When such a vehicle runs out of electricity, it is necessary to tow it back to its home garage for recharging. William T. Reid of Battelle Memorial Institute states in his article entitled "Energy Sources for Electrically Powered Automobiles" in Advanced Battery Technology that: "If storage batteries are to be a feasible source of energy for the type of car under discussion, they must have characteristics that are not available today. The goals would be to devise a battery with the following characteristics:

(1) Capable of 500 deep-discharge cycles, ample for a nominal lifetime of 75,000 miles.
(2) Power density of 0.1 horsepower-hour per pound (about five times that of present storage batteries).
(3) Volume density of 5 horsepower-hours per cubic foot (about twice that of present storage batteries).
(4) Cost of $10 per horsepower-hour capability."

Even if these goals were achieved, the electric car powered by such batteries would still have a limitation of range which is the crucial disadvantage of an electric car.

The main advantages of the battery-operated vehicle are its quiet operation, ease of control and lack of unpleasant exhaust gases. Its disadvantages are its poor performance and limited range between necessary recharging of the battery. These disadvantages stem from one fundamental cause—the very considerable weight of the battery and, despite the developments that have taken place in this field, no significant breakthrough has been achieved in the last sixty years. Neither does the fuel cell appear to offer any ready solution as an alternative source of power generation for a practical vehicle.

Hitherto, in its broadest sense, a battery-operated vehicle comprised a battery which was adapted to supply energy to an electric traction motor provided with one of numerous circuits of various degrees of sophistication. This simple construction is still proposed and used today. In all of these vehicles, the recharging of the battery is achieved either by dismounting the battery and replacing it with a fully-charged battery or charging the battery while the vehicle is not in use. It is well known that to make the best possible use of the battery, whatever its type, in this type of vehicle, one needs to overcome the poor efficiency of the battery-driven traction motor resulting from:

(i) diminution of the ampere-hour capacity of the battery as the current demand increases;
(ii) variation of the efficiency of the electric motor according to the conditions of running; and
(iii) use of systems that do not admit of regeneration of electrical energy when the vehicle goes down hill or is braked.

In the past, the electric vehicle was operated by inserting suitable resistances between the battery and the electric motor so as to limit and control the power supplied to the motor, but although this could be accomplished mechanically in a simple manner giving a very flexible control, on the other hand, a considerable amount of electric power was wasted as heat in these prior conventional resistances, particularly when starting the vehicle from rest when the voltage drop across the resistances was high and the current was large in order to obtain a high starting torque from the motor. It was also customary to use series-wound traction motors for driving the vehicle from which it was not possible to recover any of the energy stored in the moving vehicle and return it to the battery during braking (regenerative braking).

Among the main disadvantages of the battery-operated vehicle, however, the following may be mentioned, to wit: its limited range between recharges coupled with a very limited performance due to the high weight of the electric storage battery and its small installed electrical capacity. None of the proposals hitherto made, as far as I am aware, was entirely successful when carried into practice commercially on an industrial scale.

An improved battery-operated vehicle has now been discovered.

It is an object of the present invention to provide a new battery-operated vehicle.

It is another object of the invention to provide a battery-operated vehicle which has an enhanced range over the limited range of battery-driven vehicles proposed hitherto and which has a continuously charged battery.

It is a further object of the invention to provide a battery-operated vehicle of improved control and performance.

It is yet a further object of the invention to provide an improved electrical system for use in a battery-operated vehicle.

It is still another object of this invention to provide a vehicle for transportation on streets, roads, parkways, super-highways and the like, particularly in towns or congested areas where air pollution is a troublesome problem.

Other objects and advantages of the invention will become apparent from the following description taken in conjunction with the accompanying drawings in which two vehicles embodying the present invention are illustrated and three forms of power systems embodying the present invention are also illustrated.

In the drawings,

FIG. 3 is a schematic diagram showing the power plant and the control system for the vehicles in FIGS. 1 and 2;

FIG. 4 is an alternative arrangement of the schematic diagram shown in FIG. 3;

Figure 1:
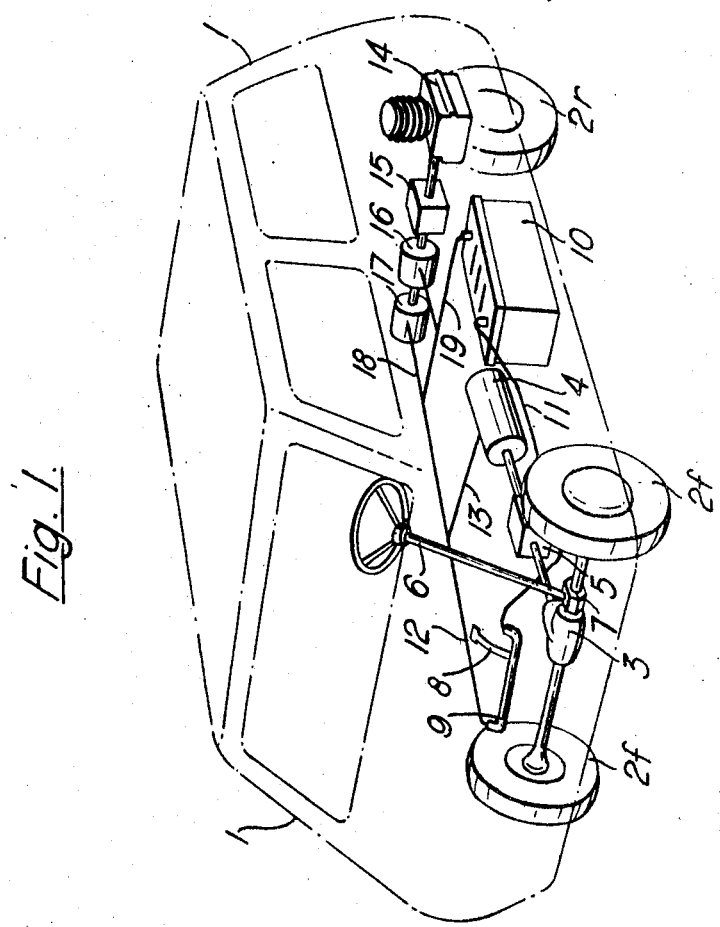
FIG. 1 is a perspective view of a small light vehicle, such as one suitable for urban traffic or for a person who is physically handicapped.

The present invention contemplates an electrical power supply system for an electrically-operated vehicle comprising an internal combustion engine driving first and second generator means, and an electric traction motor having its field winding connected to a battery. The second generator means is arranged to supply a variable output voltage and is connected in the supply circuits for the armature of the electric traction motor. Advantageously, the second generator means comprises a generator having its armature connected in series with the battery in the supply circuit for the armature of the traction motor. The field winding of this generator is connected to a voltage source which is reversible in polarity and adjustable in amplitude.

Generally speaking, the present invention involves improvements in battery-operated vehicles and, more particularly, an electric vehicle powered by an electric battery to be charged by a first generator and an electric traction motor having its field winding connected to the battery, a second generator means being arranged to supply a variable output voltage and connected in the supply circuit for the armature of the electric traction motor. The essential feature of the present invention resides in the fact that the electric traction motor can be supplied with a variable voltage to give facility of control, while at the same time, power can be supplied to or be withdrawn from the electric storage battery depending entirely on the power requirements of the traction motor and the power available from the internal combustion engine. In this way, when more power is required by the traction motor than can be supplied by the internal combustion engine alone, then power will be withdrawn from the battery. Alternatively, when less power is required by the traction motor than the internal combustion engine can supply, then power will flow into the battery. Essentially, the internal combustion engine drives two generators so that either singly or in combination two separate voltages can be obtained, one of which is variable at will to supply the traction motor and the other approximately equal to the output of the battery. By these means not only can the performance of the electric traction motor be precisely controlled but the required ebb and flow of power from the battery can be made to take place automatically in harmony with the requirements of the vehicle.

The addition of a generator for continuously charging the battery, which is driven by a small internal combustion engine, transforms the capabilities of such a vehicle to a surprising extent. Thus, a storage battery with a capacity of about 1 kilowatt hour can weigh about 100 pounds or more, but a small petrol engine and generator of a similar weight can produce about 1 kilowatt continuously with an average loading of about 1 kilowatt and for short times at much greater outputs. By this means, a considerable improvement in performance can be obtained.

For the purpose of giving those skilled in the art a better understanding of the invention, the invention will now be more fully described by reference to the accompanying drawings wherein like reference characters of the description are applied to the corresponding parts of the several figures.

In FIG. 1, the vehicle has a light body 1 carried by front and rear wheels 2f and 2r of a wheeled chassis. Road wheels 2f are connected through a differential gear 3 and are driven by an electric traction motor 4 through a gear box 5. The front wheels 2f are connected to a steering column 6 through a suitable mechanical joint 7 as those skilled in the art will readily understand. A single pedal control 8 is shown mechanically connected to a potentiometer 9. A battery 10 is connected to the potentiometer 9 through conduits 11 and 12 and the electric traction motor is connected through conduit 13. At the rear of the vehicle is an internal combustion engine 14 connected mechanically through a gear box 15 to drive twin generators 16 and 17. Conduits 18 and 19 from the twin generators 16 and 17 connect the generators to the battery 10 and also to the electric circuit of the traction motor 4 and the potentiometer 9.

Figure 2:
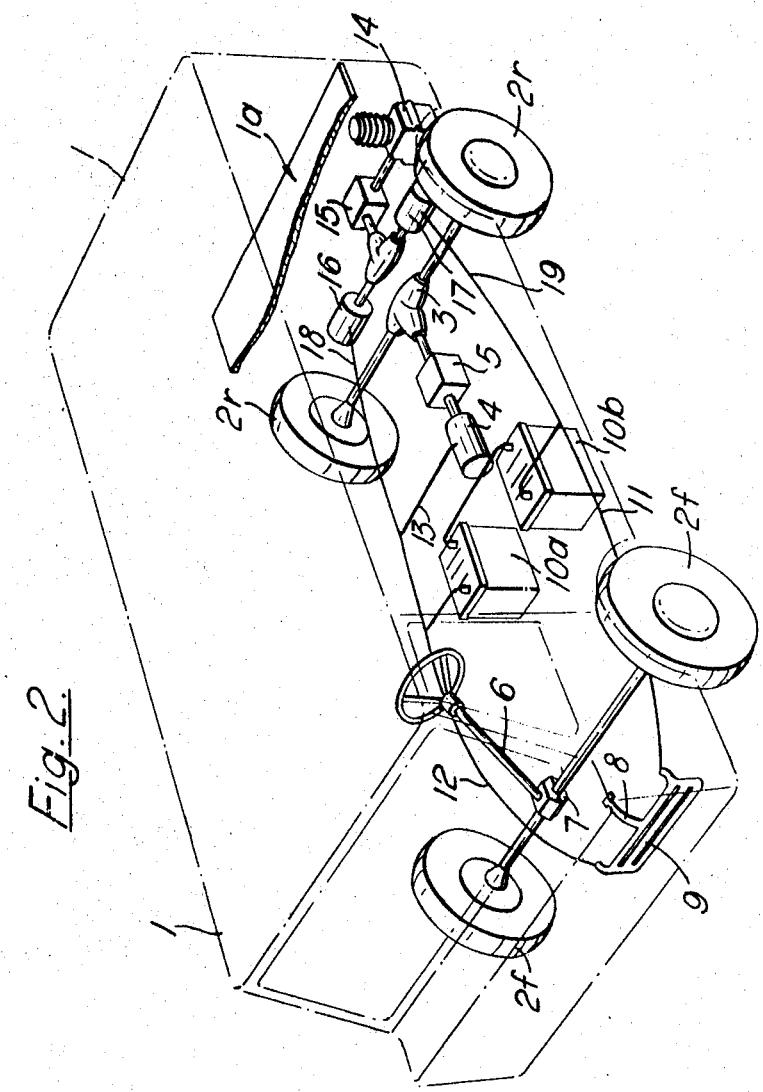
FIG. 2 is a perspective view of a commercial vehicle, such as a delivery truck or transportation van, with a large rear loading platform.

FIG. 2 shows a commercial vehicle having a conventional structure and organization with a body 1 and a large rear loading platform 1a, all of which is carried by pairs of road wheels 2f and 2r. Rear wheels 2r are connected through a differential gear 3 to an electric traction motor 4 from which they are driven through a gear box 5. Front wheels 2f are connected to a steering column 6 through a suitable mechanical connection 7. A single pedal control 8 is mechanically connected to a potentiometer 9. Twin batteries 10a and 10b are shown beneath the loading platform 1a. Batteries 10a and 10b are connected in series across the potentiometer 9 through conduits 11 and 12 and the electric traction motor 4 is connected through conduit 13. At the rear of the vehicle is an internal combustion engine 14 connected mechanically through a gear box 15 to drive twin generators 16 and 17. Conduits 18 and 19 from the twin generators 16 and 17 connect the generators to the batteries 10a and 10b and also to the circuit of the electric traction motor 4 and the potentiometer 9.

In the vehicles shown by way of example in FIGS. 1 and 2, the battery 10 may advantageously comprise two 24 volt nickel cadmium units of about 50 to 80 ampere hours capacity connected in series to give an output voltage of 48 volts. The internal combustion engine 14 may be so chosen as to develop a brake horsepower of between 6 and 10 horsepower and the electric traction motor 4 may be chosen to have an output of between about 12 and 15 horsepower. The twin generators 16 and 17 would then need to have a nominal output of about 50 volts at about 150 amperes, that is to say an output of approximately 10 horsepower. There is nothing limiting concerning those ratings and wide variations are clearly allowable in practice as those skilled in the art will readily understand.

The vehicles shown in FIGS. 1 and 2 may be controlled by any one of the electrical circuits shown in the following FIGS. 3, 4 and 5. Thus, in FIG. 3, the twin generators 16 and 17 are shown mechanically connected through a gear box 15 to the internal combustion engine 14. The generator 16 has a field winding 16a which is connected in series with a resistor 16b of such a value that when the battery is fully charged the generator current is at a low value. The armature of generator 17 is in series with the battery 10 in the supply circuit for the armature of the electric motor 4 and has its field winding 17a connected between the mid-point of a battery 10 and the slider or pedal control 8 of a potentiometer 9, which is connected directly across the battery. The field winding 4a of motor 4 is connected across battery 10. Engine 14, which drives the generators 16 and 17, is governed mechanically to operate at its most economical speed. Electric traction motor 4 is shown connected through a gear box 5 and a differential gear 3 to the driving road wheels which are associated with a chassis of the vehicle. In FIG. 1, the pair of front wheels 2f are the driving wheels whereas in FIG. 2, the pair of rear wheels 2r are the driving wheels. In this manner, the vehicle is driven along a road by the electric traction motor and the pedal control and associated potentiometer enables the operator to accelerate the vehicle to a desired speed, to continue the movement of the vehicle at a selected speed, or to retard the movement of the vehicle and to bring it to a stop when desired.

Figures 3, 4:
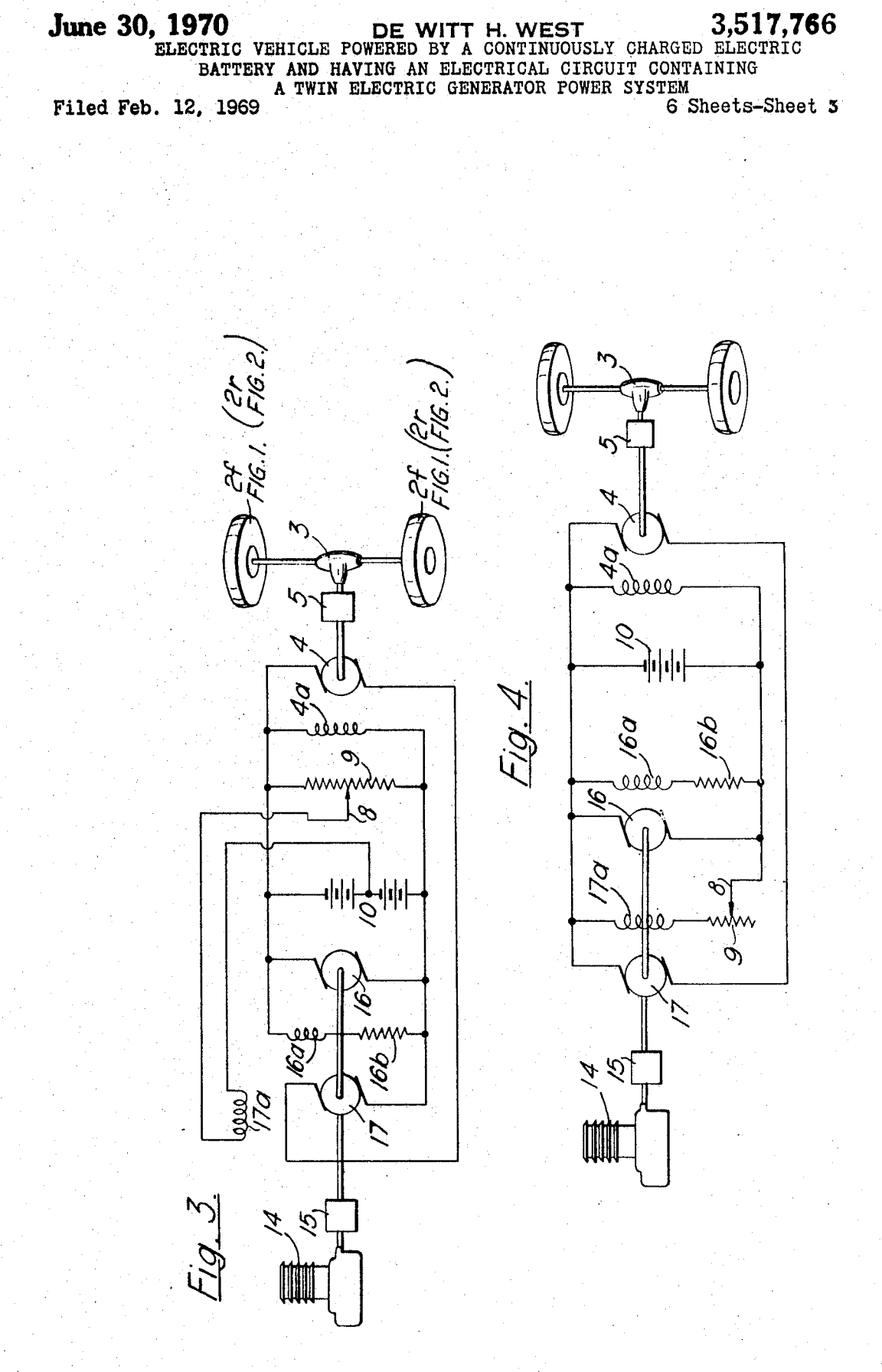

In the electric circuit illustrated in FIG. 4, it will be seen that it is not essential for the output of the generator 17 to add to that of battery 10. With such an electric circuit, it is possible to employ two shunt-wound generators 16 and 17 and a shunt-wound traction motor 4. The field winding 16a and resistor 16b of the first or charging generator 16 and the field winding 4a of the electric motor 4 are directly connected across the battery 10 whereas the field winding 17a of the second generator 17 is connected across the battery 10 through a potentiometer 9 of variable ohmic value consuming relatively low amounts of electric current. The output of the generator 16 is applied across the battery 10 and the output of the generator 17 is applied across the armature of the electric traction motor 4. The pedal control 8 operates to change the value of the resistor 9 placed in the field winding 17a.

Figure 5:
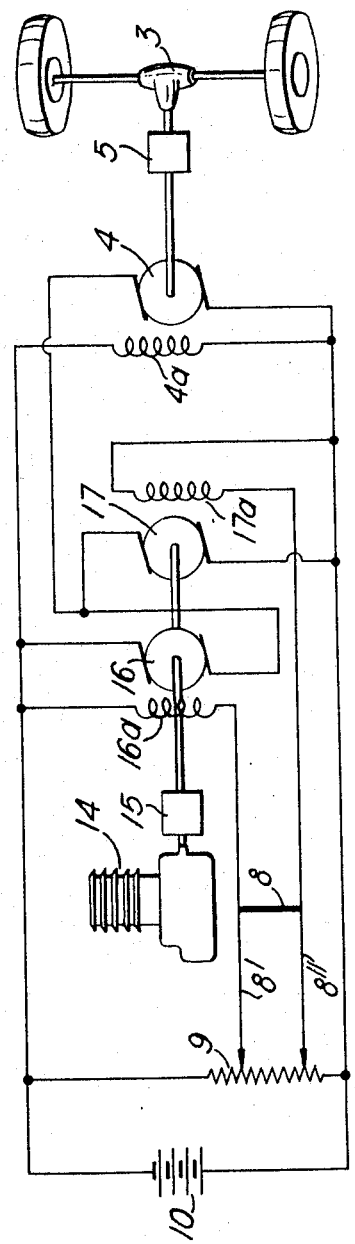
FIG. 5 is a preferred arrangement for the power plant and control system for the vehicles shown in FIGS. 1 and 2.

In FIG. 5, the armatures of the first and second generators 16 and 17 are connected in series across the battery 10 and together constitute the first generator means of the invention and the armature of the traction motor 4 is connected across the armature of the generator 17. The generator 17 alone in this circuit constitutes the second generator means of the invention. The field winding 4a of the electric traction motor 4 is connected across the battery 10 as a whole and the field winding 16a of the generator 16 is connected to a tapping 8' on a potentiometer 9 across the battery 10. The field winding 17a of the generator 17 is also connected to an adjustable tapping 8" on the potentiometer 9. Both tappings 8' and 8" are moved simultaneously by control pedal 8 so that if the latter tapping is not at the zero voltage point the generator 17 develops a voltage which is applied to the electric traction motor 4. At the same time, the movement of the generator 17 tapping from its zero and the reduction of the excitation of the generator 16 causes the combined voltages of the generators to equal approximately the output voltage of the battery 10. When the internal combustion engine 14 is overloaded, it will slow down and the generator 16 can then act as an electric motor and will assist the internal combustion engine 14 in driving the generator 17.

It will be appreciated and understood by those skilled in the art from an examination of the electric circuit diagram in FIG. 3 that by moving the control pedal 8 the voltage across the field winding 17a of the generator 17 may be continuously changed from its maximum value in one sense through zero to its maximum value in the opposite sense and in this way the vehicle may be controlled accurately in both acceleration and regenerative braking by a simple movement of the control pedal 8. The battery 10 when fully charged provides an output of 48 volts and with the pedal 8 at one end of the potentiometer 9 the generator 17 provides an output of approximately 50 volts which is equal and opposite to that of the output of the battery. Substantially no voltage is then applied to the armature of the electric traction motor 4 which is stationary. When the control padel 8 is now moved to the middle or null point of the potentiometer 9, the full voltage of generator 17 will be reduced and consequently its output voltage will fall lower than 48 volts. In these circumstances, it will no longer cancel the output voltage of the battery and the electric traction motor 4 receives current and rotates to drive the vehicle. As the control pedal 8 is moved towards the null point of the potentiometer the current flowing through the generator 17 will make it operate as an electric traction motor and it will assist the engine in driving generator 16 to replace the elertric energy which is being drawn from the battery 10. When the control pedal 8 reaches the null point, generator 17 produces substantially no voltage and so the full battery voltage is applied to the electric traction motor 4. When the control pedal is now moved beyond the null point, the voltage of generator 17 is reversed in its polarity and its output now will add to the battery output voltage. With full excitation in the reverse direction, generator 17 will produce an output of 48 volts which will add to that of the battery to make a total of 96 volts. Thus, the armature voltage of the electric traction motor 4 is varied slowly from 0 to 96 volts with potentiometer control 9 which is required to handle only relatively low or small electric currents. It will be appreciated that the single sliding resistance under the pedal control 8 gives acceleration and retardation by one simple backward and forward movement.

The internal combustion engine 14 can only supply power up to its rated capacity, that is when the governor is operated to open the throttle to its maximum setting. When, however, the electrical output from either or both of the generators 16 and 17 exceeds the output of the engine, it will be forced to slow down. As generator 16 is supplied with constant excitation, a drop in speed will result in a drop in voltage and consequently its charging current to the battery 10 will be reduced, thereby reducing the load on the engine 14. When the engine is still overloaded it will slow down still further to a point when the voltage to generator 16 will fall below that of the battery 10, the current will then flow from the battery 10 to drive the generator 16 as a motor which will then assist the engine in driving generator 17. It is possible, therefore, to supply the electrical power continuously at any voltage up to 96 volts at a rate which can be directly obtained from the two generators, provided that the combined power output of the two generators does not exceed the power output of the engine driving them. Alternatively, higher power output can be obtained by drawing power for limited periods from the battery 10. Thus, when the engine is overloaded and tends to slow down, generator 16 automatically acts as a motor drawing power from the battery 10 to assist the engine. Alternatively, higher rates can be obtained by drawing power from the battery 10 for limited periods. With the arrangement shown, the braking of the vehicles may take the very powerful form known as regenerative braking which is obtained when the back electro-motive force of the electric motor 4 is greater than the voltage applied to it when the motor will act as a generator and supply current to the battery. The magnitude of the regenerative braking effect is controlled by the movement of the control pedal 8 which varies the voltage applied to the field winding of generator 17 and controls its voltage output and hence the voltage which is applied to the electric motor 4. When the voltage applied to motor 4 is equal to the back electro-motive force of motor 4, braking will be at a minimum and when zero voltage is applied to motor 4, braking will be at a maximum since the full electro-motive force of motor 4 will be available to force current back into battery 10. Movement of control padel 8 can therefore control the regenerative braking between the maximum and minimum values.

The generator 16 is used to start up the petrol engine by means of a switch and associated circuit (not shown) well known to those skilled in the art. When the switch is closed, field winding 16a is excited which connects the armature of generator 16 to the battery. The generator then operates as a motor and will accelerate the internal combustion engine 14 until it commences to fire and continues to accelerate until the governor takes control of its speed when adjustment of the throttle of the engine by the governor will keep it turning at a constant speed. At the operating speed, generator 16 will then be charging battery 10.

It will be apparent that when the vehicle is moving forward as a result of the control pedal 8 being pushed down, when the pedal 8 is allowed to return slowly to its neutral position, the voltage applied to the electric traction motor 4 will be reduced and there will come a position at which the back electro-motive force (E.M.F.) developed across the terminals of the electric traction motor 4 is greater than that applied to it. The electric current will, therefore, be reversed and the electric traction motor 4 will operate as a generator absorbing the kinetic energy of the vehicle and will return this power as electric current to the battery 10, with the result that the vehicle slows down. During braking, the voltage generated by the electric traction motor 4 together with the voltage developed by generator 16 must be greater than the output voltage of battery 10 so that current flows into the battery 10. Furthermore, as the electric traction motor 4 slows down, its back E.M.F. will fall, and consequently generator 17 will have to generate a greater voltage in order to maintain the current charging the battery 10. Hence, it follows that to maintain the braking effect, the pedal control 8 will be required to be released until it is back at its neutral position when the generator 16 is generating its maximum voltage which will equal that of the battery. It will also be apparent that the braking effect continues almost to the point when the vehicle is stationary, when the pedal is brought back to the neutral position, since any rotary movement of the electric traction motor will produce a back E.M.F. causing the combined voltage of generator 17 and the back E.M.F. from the electric traction motor 4 to be greater than the voltage of battery 10 causing a current to pass to the battery 10 and charge it. By neutral position is meant that position of the switch arm 8 (FIG. 3) on the potentiometer where the voltage of generator 17 is equal to, but of opposite polarity to that of, the battery 10 and no voltage is applied to motor 4.

From the foregoing description, it will be seen that the more rapidly the control pedal 8 is depressed the more rapidly the vehicle accelerates and conversely once the vehicle is moving, the more rapidly the pedal 8 is returned to the neutral position the greater will be the braking effect.

In an illustrative example of the new invention, a battery-driven vehicle has been constructed in the following manner. A single cylinder air-cooled internal combustion engine of 300 cubic centimeters (cc) capacity operating at 2,000 revolutions per minute (r.p.m.) was used to provide power through a gear box having two output shafts rotating at 4,000 revolutions per minute (r.p.m.).

To each of the output shafts, a high speed fan-cooled aircraft type shunt-wound generator rated continuously at about 30 volts and about 100 amperes was coupled. An electric traction motor of similar characteristics to the generator referred to hereinbefore was coupled through a 5 to 1 reduction gear to the pinion shaft of a standard crown wheel and pinion back axle assembly well known to those skilled in the art. The battery consisted of two 12 volt 80 ampere hours capacity nickel-cadmium batteries connected in series. The circuit arrangements were as shown in FIGS. 3, 4 and 5. On the dashboard in front of the driver, a switch SW–A was provided which was used to start the petrol engine and adjacent to the switch was a three-position switch T–P–S marked clearly "Forward," "Neutral" and "Reverse." In the "Forward" position, connection is made to supply electric power to the armature of motor 4 and the field winding is also energized to give a forward rotation of the motor. In the "Neutral" position, both armature and full windings are disconnected. In the "Reverse" position, connection is again made to supply electric power to the armature of motor 4 but the field winding is also energized with the voltage applied to it in the opposite direction to that in the "Forward" position. By these means, the direction of rotation of motor 4 can be reversed. Voltmeters and ammeters to measure the various voltages and currents were also provided on the dashboard.

A single pedal control was provided and this consisted of a simple potentiometer, the resistance of which was able to be moved in and out of the electric circuit by the simple backward and forward movement of the pedal under control of the driver's foot.

The potentiometer consist basically of a coil of resistance wire which is connected across the battery. Those skilled in the art will understand that the resistance can be tapped at a number of points and then tappings can be connected to a series of studs over which a wiping or control arm can be made to travel to make contact with the various studs in sequence. Alternatively, an arm can travel directly over the coil of resistance wire making contact with each turn of wire in sequence. It is important to understand that the value of the resistance used in the potentiometer can be quite high so that the electric current and hence the electric power lost in this resistance connected across the battery is low. Thus, for instance, in case the battery voltage is 24 (approximately), the resistance of the potentiometer could be as high as 24 (approximately) ohms so that a negligible or very small amount of electric current (approximately 1 ampere) would be flowing through the resistance. On the other hand, the gauge of wire used for the potentiometer must be capable of carrying the maximum current necessary to energize fully the field winding of the generator controlled by the potentiometer. Thus, with reference to FIG. 3, a person skilled in the art will understand that as the slide 8 is moved progressively from the center of the resistance network toward either end of the resistance 9 not only will the voltage tapped for the potentiometer circuit increase but the current flowing through the resistance 9 will also increase but only over that position of the resistance between the point at which contact is made and the end of the potentiometer resistance 9 to which the slide is being moved. The further the slide is moved towards the end of the resistance, the proportion of the resistance 9 carrying the heavier current becomes progressively less until at the end of the resistance the full voltage is applied to the field winding and there is no heavy current passing through resistance 9—only that current due to its ohmic resistance and the voltage of the battery applied to it. It will be understood from this description that the loss of power through the potentiometer circuit can be kept to a surprisingly low level.

Figure 7:
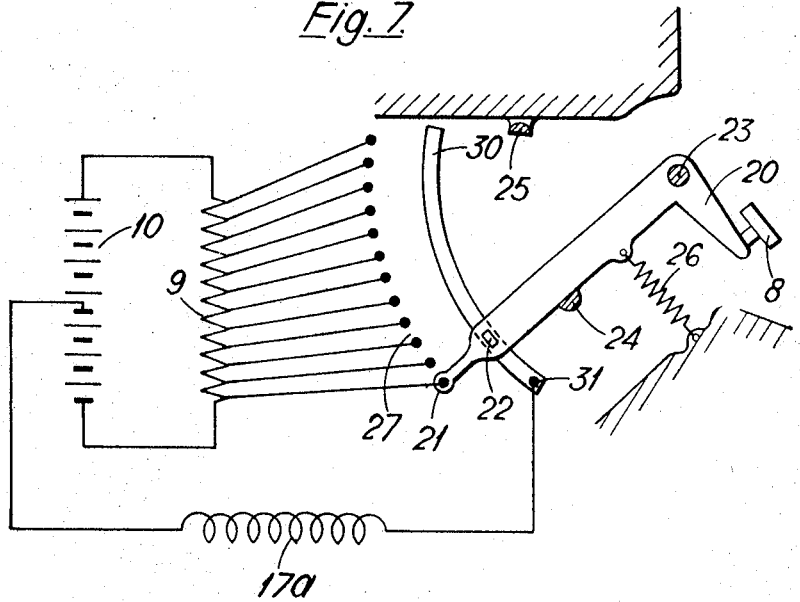
FIG. 7 illustrates a side elevation, partly in section, of a foot control pedal with an associated control electrical circuit shown diagrammatically.
Figure 8:
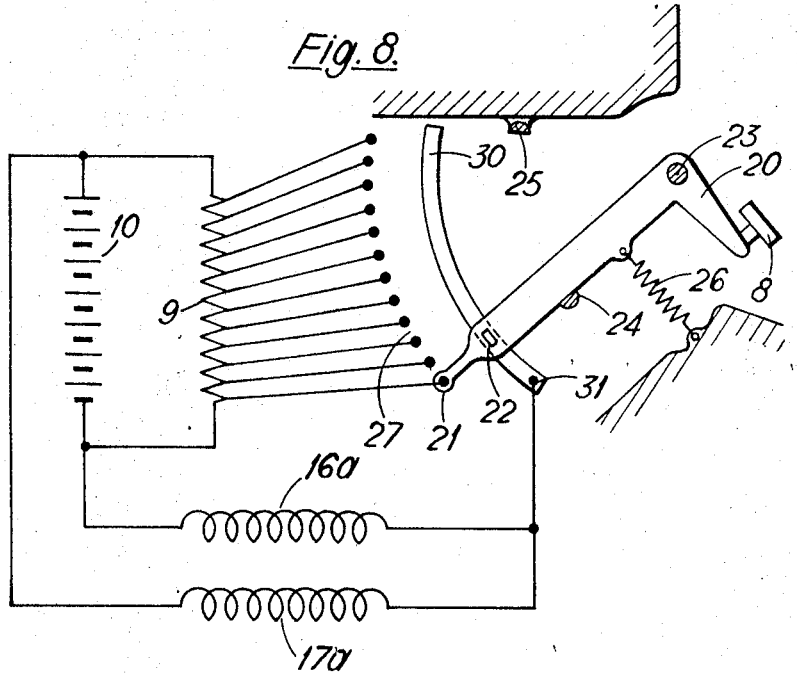
FIG. 8 is similar to FIG. 7 of a modified embodiment of the foot control pedal and associated electrical circuit.

In the operation of vehicles, such as illustrated in FIGS. 1 and 2, a foot control pedal can be used to control the potentiometer. Such a foot control pedal is illustrated in FIGS. 7 and 8 with associated electrical circuits. The former embodiment is adapted to control the electric current going to field winding 17a (see FIGS. 3 and 4) and the latter is adapted to control the electric current going to field windings 16a and 17a (see FIG. 5). The foot control may comprise a bell crank lever 20 provided with a pedal member 8 and provided with two contact sliders 21 and 22. The lever is pivotted on a pin 23 and provided with two stops 24 and 25 and a return spring 26. Contact slider 21 cooperates with a contact bridge 27 having tappings to a potentiometer rheostat 9 which is connected across a battery 10. Contact slider 22 cooperates with a contact bar 30 and is in permanent contact with it at junction 31. The contact bar 30 is in series with the field winding 17a (see FIG. 7) or the field windings 16a and 17a (see FIG. 8). Consequently, a movement of the control pedal 8 causes the slider 21 to increase or decrease the voltage to the field winding or windings and thus controls the operation of the electrical system of the vehicle as will be understood by those skilled in the art.

Some idea of the remarkable weight reduction which has been achieved by the use of this construction is shown in the following table:

| | Pounds |
|---|---|
| Weight of engine | 70 |
| 2 generators and associated gear box | 66 |
| Motor and associated gear box | 36 |
| Battery | 160 |
| Chassis | 250 |
| Estimated weight of fibre glass body | 50 |
| | 632 |

It will be seen that the total weight is 632 pounds and that this total weight is comparable with the weight of the battery alone in many of the battery-operated vehicles used hitherto.

It will be readily understood that in such a construction the inclusion of the small internal combustion engine together with the novel method of control results in an unlimited range for the vehicle, a substantial reduction in weight with a consequent advance in performance combined with powerful regenerative braking. The vehicle operates with a normal charging rate of about 50 amperes per hour. Maximum speed is about 40 to about 45 miles per hour. Maximum acceleration from rest is about $0.75g$. Of particular importance is the return of electrical energy from the electrical traction motor to the storage battery during regenerative braking. Thus, with maximum braking and the vehicle moving at only ½ mile per hour (m.p.h.), the current flow from the electrical traction motor back into the storage battery is about 30 amperes. At about 6 m.p.h. the reverse electrical current amounts to about 150 amperes and at about 10 m.p.h., about 250 amperes.

Figure 6:
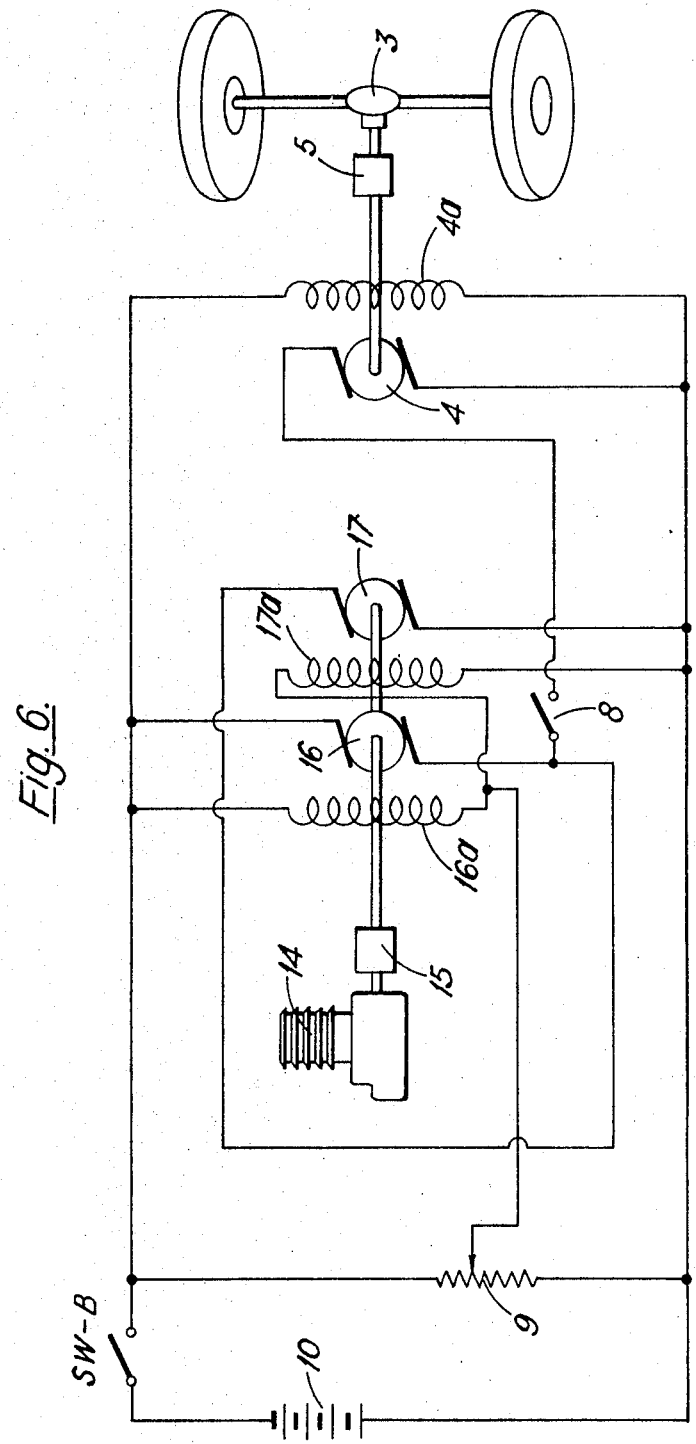
FIG. 6 is a modified circuit embodying the invention and capable of temporary use without the operation of the internal combustion engine.

The modified embodiment shown in FIG. 6 is concerned with the power system illustrated in FIG. 5. It may in some cases (for example, when driving in towns or in congested areas where air pollution is a troublesome problem) be desirable to start the vehicle without recourse to the internal combustion engine and to use it for short periods without running the engine. To facilitate such operation, the system according to the invention includes two mechanically coupled rotary electric machines which, when driven by the internal combustion engine, act as generators, having their armatures connected in series with one another and with a switch across the battery, and their field windings each connected at one end to the battery connection to the corresponding armature and having their other ends linked for coupled mechanical movement along a potentiometer connected across the batatery; the armature of the traction motor is connected through a further switch across the armature of one of these generators. When it is arranged that this generator has its field substantially unenergized and the other generator has its field fully excited, the closure of the first switch causes the latter generator to operate as a motor accelerating the "motor-generator" set consisting of the two generators up to operating speed. The closure of the second switch followed by the progressive energization of the previously unenergized generator and the progressive reduction of field current through the other generator, results in a progressively increasing supply of power to the traction motor, enabling the latter to start smoothly without the internal combustion engine.

In FIG. 6, the battery 10 is connected through the switch SW–A across three parallel branches, one of which includes the two generator armatures 16 and 17, a second of which includes the two field windings 16a and 17a of these generators, and a third branch of which is formed by the body of the potentiometer 9, the wiper or arm of which is connected to the junction of the field windings 16a and 17a. A second switch SW–B permits the armature of the electric traction motor 4 to be connected across the armature of the generator 17. The field winding 4a of the traction motor forms a fourth branch of the parallel circuits which are connected across the battery by the closure of switch SW–A.

When switch SW–A is closed with the potentiometer wiper in the position shown, the field winding of the generator 16 is fully energized, but that of generator 17 is unenergized. The generator 16 therefore acts as a motor, and, being mechanically coupled to the generator 17, it accelerates the latter up to operating speed, the switch SW–B being open during this portion of the starting operation. The switch SW–B is now closed but since the field winding of generator 17 is not yet excited, the armature of motor 4 is unenergized and the motor does not start. When the potentiometer wiper, which is mechanically coupled to the accelerator or control pedal, is now moved along the potentiometer track, the generator 17 begins to generate current and to supply power to the traction motor 4. At the same time, the excitation of field winding 16a decreases so that the combined voltages of generators 16 and 17 continue to be approximately equal to the battery voltage.

When it is desired to use the internal combustion engine 14 again, a clutch is operated to couple the engine to the generators 16 and 17 and the power system and vehicle then act as described hereinbefore.

In the present invention, the novel combination illustrated in the drawings and particularly in FIG. 3 includes an internal combustion engine which is governor controlled and which drives a shunt-wound generator. The main function of this shunt-wound generator is to charge a storage battery at a rate equal to the average usage of electric power by the electric traction motor driving the vehicle. A second generator is also driven by the engine, the voltage from which is applied between the battery and the traction motor. The voltage from this second generator can be controlled by altering the direction and magnitude of the electric current flowing through its shunt winding so that the voltage developed by this second generator can be subtracted from the constant voltage of the battery or can be added to it. It will be apparent that when the field winding of the second generator can be excited so that the voltage developed by the generator is equal in magnitude to that of the battery but the two voltages are in opposition they will cancel each other and no voltage will be applied to the electric tranction motor. When the current passing through the field winding of the second generator is reduced, then the voltage developed by the generator will fall and the electric traction motor will be supplied with the difference in voltage between that of the battery and the voltage developed by the second generator. When the current through the field winding is reduced to zero, then no voltage will be developed by the second generator and the full battery voltage will be applied to the electric traction motor. Furthermore, when a current is allowed to flow through the field winding of the second generator in the opposite direction, a voltage will be developed which is now added onto the battery voltage—thus supplying the electric traction motor with a voltage greater than that of the battery.

It will also be apparent that as soon as the shunt-wound traction motor begins to rotate or revolve, it will produce a back E.M.F. and that when a voltage is applied to it greater than this back E.M.F. at any speed, then the electric traction motor will drive the vehicle and will accelerate it. When the voltage applied is less than the back E.M.F., then deceleration of the vehicle will occur. The control of the vehicle, therefore, is obtained entirely by the output voltage of the second generator which in turn is controlled by altering the current which flows through its field winding.

Moreover, other aspects of the invention will aslo be apparent to those skilled in the art. Thus, when the voltage of the second generator is below that of the storage battery but is in opposition to it and current is flowing through it to the electric traction motor, then the second generator will operate as a motor with a power output corresponding to the voltage across its terminals multiplied by the current passing through it. Consequently, it will assist the internal combustion engine in driving the first generator and in recharging the battery. It is to be appreciated that the electric power in the conventional resistance-controlled traction motor is wasted, whereas it is largely returned by the use of the present invention to the storage battery or alternatively is effective in reducing the fuel consumption of the internal combustion engine. The returned power from the second generator is divided between an increased electrical charging rate of the battery and the mechanical assistance to the internal combustion engine. The division depends on many factors and the most important is the sensitivity of the engine governor to changes in speed. However, as the power for operating the vehicle comes entirely from the fuel supplied to the internal combustion engine, it will be evident that the division or distribution of electric power at any instant is unimportant. The important factor is the return of this electric power that is normally wasted results in fuel economy when the present invention is used.

Furthermore, it is to be appreciated that when the voltage of the second generator is added to that of the battery, the second generator will then generate electric power and will absorb power from the internal combustion engine. To keep the speed of the generator constant, the governor on the engine will open the throttle wider to supply sufficient fuel to meet the increased power requirements. When the throttle is opened to the full extent and the engine cannot supply all of the power requirements, the engine will slow down and, as a result, the charging current from the first generator will fall and this load will be shed. In the event that the engine is still overloaded and its speed falls still further, then current will flow from the battery into the first generator which will then operate as a motor to assist the engine in driving the second generator.

It is to be observed that the control of the second generator shunt winding can be obtained by the use of a potentiometer. For instance, the potentiometer may consist of a tapped resistance applied across the battery with the field winding of the second generator connected to the mid point of the battery and to a control or wiping arm on the potentiometer which can be moved to make contact with any of the tappings of the resistance. When the movable wiping arm of the potentiometer is at the center tapping of the resistance, no voltage will be applied to the field winding of the second generator while a movement in either direction from this mid point will result in a current flowing through the field winding. The direction of the current will depend on which side of the mid or center point the wiping arm makes contact with the resistance. The electric current flowing through the field winding will be at a maximum at either end of the resistance where half the battery voltage is applied to the field winding as those skilled in the art will readily understand.

Alternatively, or in addition to a voltage control, a signal can be obtained from the position of the throttle which is actuated mechanically by the engine governor. It will be understood that the total mechanical loading of the first and second generators at any instant will be reflected onto the engine governor. Thus, when the loading is heavy the throttle will be opened wide and when the loading is light the throttle will be only slightly open. The movement of the throttle can be linked to a variable resistance in the shunt circuit of the first generator so that as the throttle is automatically opened to give more power from the engine, the resistance is increased thereby reducing the voltage of the first generator and the charging current and thereby reducing the mechanical loading on the engine. Conversely, as the throttle is closed by the governor when the mechanical power requirements of the two generators fall, the resistance can be reduced thereby increasing the current in the shunt winding of the first generator and thereby increasing the voltage and the mechanical loading on the engine.

Although the present invention has been described in conjunction with preferred embodimets, it is to be understood that modifications and variations may be resorted to without departing from the spirit and scope of the invention, as those skilled in the art will readily understand.

I claim:

1. In an electric power supply system for an electrically operated vehicle having an internal combustion engine driving first and second generator means to charge a battery connected to the said first generator means and having an electric traction motor, the field winding of which is connected to the said battery, an improvement for controlling the vehicle, said improvement comprising a first generator means comprising two generators which are connected in series across the battery, the second generator means comprising one only of these generators, the armature of the said second generator being connected across the motor, the field winding of which is connected to a variable power supply derived from the said battery and the combined voltages of the two generators being equal to the battery voltage.

2. In an electric power supply system for an electrically operated vehicle comprising an internal combustion engine driving first and second generator means and having a battery connected to be charged by the first generator means and having an electric traction motor, the field winding of which is connected to the battery and having the second generator means comprising a generator, the armature of which is connected in series with the said battery in the supply circuit for the said armature of the said motor and having the field winding of this generator connected to a voltage source which is adjustable in amplitude, the improvement for controlling the vehicle, said improvement comprising connecting both first and second generators in series with the battery and supplying the said motor direct from the second generator, the filed windings of both the said generators being connected between a tapping on the said battery and the slider of a potentiometer which is connected across the said battery such that the combined voltages of the two generators are equal to the battery voltage.

3. An electrical power supply system for an electrically operated motor vehicle, comprising first and second mechanically coupled rotary electric machines having their armatures connected in series with one another and with a switch across a battery, and their field windings each connected at one end to the battery connection to the corresponding armature and having their other ends linked for coupled mechanical movement along a potentiometer connected across the battery, means for coupling an internal combustion engine to the said rotary electric machines to drive them as generators, and a traction motor having its armatuer connected through a second switch across the armature of the second rotary electric machine, whereby the traction motor can be started with the internal combustion engine uncoupled from the rotary electric machines by setting the potentiometer connections so that the field windings of the first and second machines are respectively energized and substantially unenergized, closing the first and second switches in that order and then progressively decreasing and increasing respectively the field energization of the first and second machines to progressively increase the supply of power to the traction motor.

4. A system in accordance with claim 3 in which the field windings of the said rotary electric machines are electrically connected to a common wiper of the potentiometer, the common wiper being mechanically coupled to the accelerator pedal.

5. In an electric power supply system for a twin generator, electric-powered vehicle adapted to operate on a road and having an internal combustion engine driving first and second generator means to charge a storage battery connected to the said first generator means and having an electric traction motor, the field winding of which is connected to the storage battery, the improvement for powering and controlling the aforesaid vehicle comprising a first generator means involving two generators which are connected in series across a storage battery, the second generator means comprising only one of these generators, the armature of the said second generator being connected across the electric traction motor with the field windings of the two generators being connected to a variable power supply derived from the storage battery and the combined voltages of the two generators being approximately equal to the battery voltage.

6. In an electric power supply system for a twin generator, electric-powered vehicle for operating on a road comprising an internal combustion engine driving first and second generator means and having a storage battery connected to be charged by the first generator means, the second generator means having its armature connected in series with the storage battery in a supply circuit for the armature of the traction motor and having its field winding connected to a voltage source which is adjustable in amplitude, and an electric traction motor having its field winding connected to the storage battery, the improvement for powering and controlling the aforesaid vehicle comprising an electric circuit connecting both first and second generator means in series with the storage battery and supplying an electric traction motor direct from the second generator means, the field winding of both the generator means being connected between a tapping on the storage battery and the slider of a potentiometer which is connected across the storage battery such that the combined voltages of the two generators are substantially equal to the battery voltage.

7. In an electric power supply system for a twin generator, electric-powered vehicle adapted to operate on a road and having an internal combustion engine driving first and second generator means to change a storage battery connected to the first generator means, and an electric traction motor having its field winding connected to a storage battery, the improvement for powering and controlling a vehicle comprising a first generator means involving two generators connected in series across a storage battery, a second generator means comprising only one of these generators, the armature of the said second generator means being connected across an electric motor and the combined voltages of the two generator means being substantially equal to the battery voltage, an electric traction motor having its field winding connected to a power supply derived from the storage battery, a potentiometer connected across the storage battery and provided with a single sliding resistance, electrical connections provided between said potentiometer and said generators, and a control pedal mechanically associated with the sliding resistance of the potentiometer to give acceleration and retardation by one single backward and forward movement thereof whereby the armature voltage of the electric traction motor is varied slowly from zero to a maximum and return by the potentiometer and pedal control which is only required to handle small currents.

8. In an electric power supply system for a twin generator, electric-powered vehicle for operating on a road comprising an internal combustion engine driving first and second generators, a storage battery to be charged by these generators, an electric traction motor having its field winding connected across the battery, the second generator having its armature connected in series with the said storage battery in a supply circuit for the armature of the traction motor and having its field winding connected to a voltage source which is adjustable in amplitude, the improvement for powering and controlling a vehicle comprising an electric circuit connecting both first and second generators in series with a storage battery, the field windings of both of said generators being connected in a series across the storage battery, an electric traction motor supplied with electric power direct from the second generator, and a potentiometer having a slider connected to the mid-point of the said field windings and also connected across the storage battery so that the combined voltages of the two generators are substantially equal to the battery voltage.

9. A twin-generator, electric-powered vehicle for operating on a road comprising a fuel-fed internal combustion engine, two electric generators rigidly mounted on a common shaft and adapted to receive mechanical power from the engine, an electric traction motor with an armature connected to receive electric power from one of said generators, an electric storage battery connected to the field winding of said traction motor, said generators having their armature windings and also their field windings connected in series with respect to each other and across the terminals of said storage battery, a potentiometer with its ends connected across the terminals of said storage battery and a sliding contact on said potentiometer connected to the mid point of the said series-connected generator field windings, and a control pedal operatively associated with the sliding contact of the potentiometer in such a manner that the more rapidly the control pedal is depressed the more rapidly the vehicle accelerates and conversely once the vehicle is moving, the more rapidly the control pedal is returned to a neutral position the greater will be the braking effect.

10. A twin-generator, electric-powered vehicle for operating on a road comprising a wheeled chassis supporting a fuel-fed internal combustion engine, two electric generators mechanically coupled together and adapted to receive mechanical power from the engine, series-connected field windings provided for said generators, a storage battery adapted to be charged by the generators, a potentiometer connected across the storage battery, an electric traction motor to drive the vehicle, electrical circuits adapted to connect the two generator armatures in series with respect to each other and in parallel with respect to the storage battery, a sliding contact on a potentiometer connected to the mid point of the series-connected generator field windings, electrical circuits adapted to connect the electric traction motor armature across the terminals of one of the generator armatures and also to connect the traction motor field winding across the battery terminals, and a potentiometer control operatively associated with the sliding contact of the potentiometer whereby the vehicle may be electrically accelerated or regeneratively braked by the operation of the novel and simple potentiometer control.

11. A twin-generator, electric-powered vehicle for operating on a road comprising a wheeled chassis supporting a fuel-fed internal combustion engine, two electric generators mechanically coupled together and adapted to receive mechanical power from the engine and to produce electric power, series-connected field windings provided for said generators, a storage battery adapted to be charged by the electric power, a potentiometer connected across the storage battery, an electric traction motor to drive the vehicle, electrical circuits adapted to connect the two generator armatures in series with each other and in parallel with the storage battery, a sliding contact on the potentiometer connected to the mid point of the series connected generator field windings, electrical circuits adapted to connect the traction motor armature across the terminals of one of the generator armature windings and also to connect the traction motor field winding across the battery terminals, a potentiometer control operatively associated with the sliding contact of the potentiometer, whereby the vehicle may be electrically accelerated or regeneratively braked effectively by the operation of the novel and simple low amperage potentiometer control, and switching means for optionally breaking a connection to the battery and to the traction motor armature whereby the vehicle may be propelled optionally by a varied combination of power sources.

12. An electrical power supply system for a twin generator, electric-powered vehicle for operating on a road comprising an internal combustion engine driving first and second generator means, a storage battery connected to be charged by the first generator means, an electric traction motor for driving the vehicle having its field winding connected to the battery, electric circuits arranged to supply a variable output voltage from the second generator means and connected in the supply circuits for the armature of the electric traction motor, a potentiometer having a slider operable over a resistance of variable ohmic value adapted to handle small electric currents and connected directly across the whole storage battery whereby the vehicle may be electrically accelerated or regeneratively braked effectively by the operation of the low amperage control, electrical connections provided between said potentiometer and said generator means, and a single pedal control mechanically and operatively associated with the slider of the potentiometer for effecting acceleration and retardation of the vehicle by a simple movement of the slider in one direction and in the other whereby the armature voltage of the electric traction motor may be varied from zero to a maximum and reversed to any selected extent.

13. An electrical power supply system according to claim 12, in which the second generator means comprises a generator, the armature of which is connected in series with the storage battery in the supply circuit for the armature of the motor and the field winding of which is connected to a potentiometer and to a voltage source which is reversible in polarity and adjustable in amplitude.

14. An electrical power supply system according to claim 12, in which the first generator means comprises two generators which are connected in series across the storage battery, electrical connections provided between the potentiometer and the generators, and the second generator means comprises one only of these generators, the armature of the latter generator being connected across the motor and the field windings of the two generators being connected to a variable power supply derived from the battery.

15. An electrical power supply system for a twin generator, electric-powered vehicle for operating on a road comprising an internal combustion engine driving first and second generator means, a storage battery connected to be charged by the first generator means, an electric traction motor for driving the vehicle having its field winding connected to the battery, electric circuits arranged to supply a variable output voltage from the second generator means and connected in the supply circuits for the armature of the electric traction motor, a potentiometer having a slider operable over a resistance of variable ohmic value adapted to handle small electric currents and connected directly across the whole storage battery whereby the vehicle may be electrically accelerated or regeneratively braked effectively by the operation of the low amperage control, electrical connections provided between said potentiometer and said generator means, the second generator means comprising a generator, the armature of which is connected in series with the storage battery in the supply circuits for the armature of the electric traction motor and the field windings of which is connected between a tapping on the storage battery and the slider of the potentiometer which is connected across the whole of the storage battery to provide a voltage source which is reversible in polarity and adjustable in amplitude, and a single pedal control mechanically and operatively associated with the slider of the potentiometer for effecting acceleration and retardation of the vehicle by a simple movement of the slider in one direction and in the other whereby the armature voltage of the electric traction motor may be varied from zero to a maximum and reversed to any selected extent.

References Cited

UNITED STATES PATENTS

| | | | |
|---|---|---|---|
| 943,434 | 12/1909 | Maier | 290—10 XR |
| 1,418,977 | 6/1922 | Schon | 290—10 |
| 1,423,090 | 7/1922 | Delano. | |
| 1,831,071 | 11/1931 | Jones | 180—65 XR |
| 2,813,984 | 11/1957 | Dolecki et al. | 290—10 |

FOREIGN PATENTS 3,281      1912    Great Britain.

LEO FRIAGLIA, Primary Examiner

M. L. SMITH, Assistant Examiner

U.S. Cl. X.R.

290—16